(12) United States Patent
Shimizu

(10) Patent No.: US 8,213,200 B2
(45) Date of Patent: Jul. 3, 2012

(54) SWITCHING POWER SUPPLY APPARATUS

(75) Inventor: Hideo Shimizu, Higashimurayama (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 468 days.

(21) Appl. No.: 12/591,016

(22) Filed: Nov. 4, 2009

(65) Prior Publication Data

US 2010/0110738 A1    May 6, 2010

(30) Foreign Application Priority Data

Nov. 4, 2008  (JP) ................................ 2008-283041
May 25, 2009  (JP) ................................ 2009-125617

(51) Int. Cl.
    *H02M 7/217*    (2006.01)
(52) U.S. Cl. .............................. 363/89; 363/44; 323/207
(58) Field of Classification Search .................. 363/89, 363/44, 45–48, 79; 323/207, 222
    See application file for complete search history.

(56) References Cited

U.S. PATENT DOCUMENTS

| | | | | |
|---|---|---|---|---|
| 6,373,735 B2* | 4/2002 | Usui | ................................ | 363/89 |
| 6,882,551 B2* | 4/2005 | Shimada et al. | ................. | 363/79 |
| 7,352,599 B2* | 4/2008 | Shimada | .......................... | 363/79 |
| 2005/0068796 A1* | 3/2005 | Morita | ........................... | 363/120 |

FOREIGN PATENT DOCUMENTS

| JP | 04-168975 A | 6/1992 |
|---|---|---|
| JP | 2004-282958 A | 10/2004 |
| JP | 2007-143383 A | 6/2007 |

* cited by examiner

*Primary Examiner* — Harry Behm
(74) *Attorney, Agent, or Firm* — Rabin & Berdo, P.C.

(57) ABSTRACT

In a switching power supply apparatus, multiplier 9 multiplies error voltage Verr generated in voltage error amplifier 8 and input voltage Vin to generate first threshold signal Vth1 in-phase with and similar to input voltage Vin and having an amplitude proportional to error voltage Verr. Second threshold signal generator circuit 14 generates second threshold signal Vth2 from first threshold signal Vth1. Switching device 7 is turned on and off so that the inductor current may change between first and second threshold signals Vth1 and Vth2. The switching frequency is detected and the proportional factor of first and second threshold signals Vth1 and Vth2 is changed to control the average switching frequency almost at a constant value for reducing the high frequency noises and the switching losses. The switching power supply apparatus facilitates reducing the noises and losses, improving the power factor thereof, and preventing the response performances thereof from being impaired.

8 Claims, 8 Drawing Sheets

SWITCHING POWER SUPPLY APPARATUS

FIELD OF THE INVENTION

The present invention relates to switching power supply apparatuses of a power-factor-improving-type that obtain a stable DC power supply from an AC power supply and make a chopper circuit operate such that the input voltage and the input current thereof are almost in-phase with and similar to each other.

BACKGROUND

The control methods for controlling the power-factor-improving-type switching power supply apparatuses include a critical conduction mode control method and a continuous conduction mode control method. In the critical conduction mode control method, a switching device is turned on as the inductor current becomes 0. In the continuous conduction mode control method, the inductor current is controlled so as not to be 0.

Since the switching device conducts switching when the inductor current is 0 in the critical conduction mode control method generally, the switching noise caused is low. Therefore, the critical conduction mode control method is advantageous for reducing the noises. However, since a large current ripple is caused in the critical conduction mode control method, a large stress is exerted to the inductor and the diode. Therefore, it is hard to apply the critical conduction mode control method to the use, in which the load is heavy.

Although a larger switching noise is caused in the continuous conduction mode control than in the critical conduction mode control, a smaller current ripple is caused in the continuous conduction mode control and the stress exerted to the inductor and diode is small. Therefore, the continuous conduction mode control method is applicable to the use, in which the load is heavy. Therefore, it is general to employ the critical conduction mode control method when the load is 100 watt or lighter and to employ the continuous conduction mode control method when the load is heavier than 100 watt.

FIG. 6 is a block circuit diagram showing the conventional switching power supply apparatus of the continuous conduction-mode-control-type disclosed in Japanese Unexamined Patent Application Publication No. Hei. 04 (1992)-168975. In FIG. 6, AC power supply 1, rectifier circuit 2 formed of a diode bridge, capacitors 3 and 6, inductor 4, diode 5, switching device 7 such as a metal oxide-film field-effect transistor (hereinafter referred to as "MOSFET"), voltage error amplifier 8, multiplier 9, comparator 10, monostable multivibrator 11, resistor for current detection (hereinafter referred to as "current detecting resistor") 12, and driver circuit 13 are shown.

The output voltage from AC power supply 1 is full-wave-rectified by rectifier circuit 2 and high frequency noises are removed by capacitor 3. A current is fed to capacitor 6 via inductor 4 and diode 5 and smoothed DC voltage Vout is outputted. The one end of switching device 7 such as a MOSFET is connected between inductor 4 and diode 5. As switching device 7 is turned on and the inductor current from inductor 4 flows through switching device 7, energy is stored in inductor 4. As switching device 7 is turned off, the inductor current is turned to flow to diode 5 and the energy stored in inductor 4 is released to the output side.

Voltage error amplifier 8 outputs error voltage Verr obtained by amplifying the difference between output voltage Vout and output reference voltage Vref to multiplier 9. Multiplier 9 multiplies error voltage Verr and input voltage Vin and generates threshold signal Vth in-phase with and similar to input voltage Vin and having an amplitude proportional to error voltage Verr.

The current flowing through inductor 4 is converted into current detection signal Vi by current detecting resistor 12 and current detection signal Vi is compared with threshold signal Vth in comparator 10. The output from comparator 10 is fed to the trigger input of monostable multivibrator 11. Monostable multivibrator 11 keeps, after the trigger signal is inputted thereto, the output therefrom at a low level for a certain period and, then, changes the output therefrom to a high-level one. The output from monostable multivibrator 11 is fed to driver circuit 13. Driver circuit 13 turns on switching device 7 when the input thereto is at a high level and turns off switching device 7 when the input thereof is at a low level.

As switching device 7 in the circuit configured as described above is turned on, the current from inductor 4 increases and current detection signal Vi rises. As current detection signal Vi becomes equal to or larger than threshold signal Vth, the output from comparator 10 is set at the high level and a trigger signal is fed to monostable multivibrator 11. As the trigger signal is fed to monostable multivibrator 11, the output from monostable multivibrator 11 is set at the low level and switching device 7 is turned off by driver circuit 13. As switching device 7 is turned off, the current from inductor 4 decreases gradually. Since the low level period of monostable multivibrator 11 is set so as not to make the current from inductor 4 decrease to 0, the output from monostable multivibrator 11 changes the level thereof to high one as the current from inductor 4 decreases to some extent and switching device 7 is turned on by driver circuit 13.

FIGS. 7A and 7B describe the operations described in the preceding paragraphs. The peaks of the detection signal indicating the current flowing through inductor 4 are controlled to coincide with threshold signal Vth in-phase with and similar to input voltage Vin. Since the ON-period changes while the OFF-period is fixed, the switching frequency changes and the frequencies of the noise caused also change. Therefore, the noise spectrum is diversified and the noises caused in the continuous conduction mode of operation are reduced. FIG. 7A is a wave chart describing the relation between threshold signal Vth and current detection signal Vi. FIG. 7B is a wave chart describing the ON- and OFF-waveform of switching device 7.

For improving the power factor, it is necessary for the input current to be in-phase with and similar to the input voltage. For setting the input current to be in-phase with and similar to the input voltage, it is necessary to change the ON-OFF duty ratio widely from the vicinity of 0% to the vicinity of 100%. The voltage across the inductor in the 100 V system is different from the voltage across the inductor in the 200 V system. Moreover, the voltage across the inductor changes during the one cycle of the AC input voltage. Therefore, the changing rate (di/dt) of the current flowing through the inductor changes greatly. Therefore, the current variation in a certain period changes greatly depending on the value and phase of the input voltage and the state of the load. If the OFF-period is fixed as in the conventional continuous conduction mode control, the right magnitude of current change will not be obtained and the power factor will not be improved as expected.

Japanese Unexamined Patent Application Publication No. 2007-143383 proposes a method for improving the power factor, which sets first threshold signal VTh1 and second threshold signal VTh2 proportional to first threshold signal VTh1 such that VTh1>VTh2, turns off the switching device as the current flowing through the inductor reaches first threshold signal VTh1, and turns on the switching device as the current flowing through the inductor reaches second threshold signal VTh2. According to the method described above, the ON- and OFF-periods are not fixed and the switching device is turned on and off automatically for the optimum periods depending on the state of the input voltage and the state of the load and, by which the power factor is improved.

The switching frequency (period) is determined by the difference between first and second threshold signals VTh1 and VTh2 and by the changing rate of the inductor current. The changing rate of the inductor current is determined by the input voltage, the output voltage and the inductor inductance. The parameters that determine the switching frequency change in various manners. First threshold signal VTh1, that is the product of error signal Verr and input voltage Vin, changes, since error signal Verr changes as the load weight changes. (Error signal Verr changes to be small under a light load and to be large under a heavy load.) The inductance changes due to the variations caused during the manufacture thereof and the temperature characteristics thereof. The input voltage changes greatly between the 100 V system and the 200 V system. The output voltage changes depending on the use of the switching power supply apparatus. The output voltage also changes a little bit depending on the load weight. Since the parameters that determine the switching frequency change as described above, the switching frequency changes in various manners.

However, as the average switching frequency increases, the maximum frequency becomes too high, increasing the noise and switching loss. If the average switching frequency decreases on the other hand, the response performance of the switching power supply apparatus will be impaired.

In view of the foregoing, it would be desirable to obviate the problems described above. It would be also desirable to provide a switching power supply apparatus that controls second threshold signal Vth2 to keep the average switching frequency at a certain value for reducing the noises and losses so that the power factor may be improved and the response performance of the power supply may be prevented from being impaired, even if the parameters such as first reference signal Vth1, the input voltage, the output voltage and the inductance change.

SUMMARY OF THE INVENTION

There is provided a switching power supply apparatus including:

a rectifier circuit conducting the full-wave-rectification of an AC power supply voltage to obtain a pulsating output;

a chopper circuit including an inductor, a capacitor, and a switching device, the inductor having a first end connected to the rectifier circuit and a second end connected to the switching device, the capacitor smoothing the current fed from the inductor for obtaining a DC output, the switching device switching on or off the current fed to the capacitor;

an input voltage detector circuit detecting a voltage input to the chopper circuit and outputting an input voltage detection signal;

an output voltage error detector circuit detecting the error between the input voltage detection signal and a set voltage, and outputting an output voltage error signal;

a first threshold signal generator circuit generating a first threshold signal in-phase with the input voltage detection signal, the first threshold signal having a waveform similar to the waveform of the input voltage detection signal, and the first threshold signal having an amplitude proportional to the output voltage error signal;

a second threshold signal generator circuit dividing the potential difference between the first threshold signal and a reference potential, and generating a second threshold signal;

a current detector circuit detecting the current flowing through the inductor, and outputting a current detection signal;

a switching control circuit comparing the current detection signal with the first threshold signal and the second threshold signal to turn off the switching device when the current detection signal is equal to or larger than the first threshold signal, and to turn on the switching device when the current detection signal is equal to or smaller than the second threshold signal;

a switching frequency detector circuit detecting the switching frequency of the switching device, and outputting a frequency detection signal;

a frequency error detector circuit comparing the frequency detection signal with a reference frequency signal, and outputting a frequency error signal wherein the second threshold signal generator circuit changes a voltage dividing ratio of the second threshold signal to the first threshold signal based on the frequency error signal to set the frequency detection signal to be almost constant.

The second threshold signal generator circuit includes a first resistor having a first end connected to the first threshold signal generator circuit, and a transistor connected between the second end of the first resistor and the reference potential, the second threshold signal generator circuit divides the potential difference between the first threshold signal and the reference potential with the first resistor and the transistor for generating the second threshold signal, and the transistor is driven based on the frequency error signal for changing the voltage dividing ratio of the second threshold signal to the first threshold signal further for setting the frequency detection signal to be almost constant.

The second threshold signal generator circuit includes a first resistor having a first end connected to the first threshold signal generator circuit and a series circuit, the series circuit including a second resistor having a first end connected to the second end of the first resistor and a transistor, the transistor connected between the second end of the second resistor and the reference potential, the second threshold signal generator circuit divides the potential difference between the first threshold signal and the reference potential of the first resistor and the series circuit, and generates the second threshold signal, and the transistor is driven based on the frequency error signal for changing the voltage dividing ratio of the second threshold signal to the first threshold signal further for setting the frequency detection signal to be almost constant.

There is provided a switching power supply apparatus including:

a rectifier circuit conducting the full-wave-rectification of an AC power supply voltage to obtain a pulsating output;

a chopper circuit including an inductor, a capacitor, and a switching device, the inductor having a first end connected to the rectifier circuit and a second end connected to the switching device, the capacitor smoothing the current fed from the inductor to obtain a DC output, the switching device switching on or off the current fed to the capacitor;

an input voltage detector circuit detecting a voltage input to the chopper circuit and outputting an input voltage detection signal;

an output voltage error detector circuit detecting the error between the input voltage detection signal and a set voltage, and outputting an output voltage error signal;

a first threshold signal generator circuit generating a first threshold signal in-phase with the input voltage detection signal, the first threshold signal having a waveform similar to the waveform of the input voltage detection signal, and the first threshold signal having an amplitude proportional to the output voltage error signal;

a second threshold signal generator circuit dividing the potential difference between the first threshold signal and a reference potential, and generating a second threshold signal;

a current detector circuit detecting the current flowing through the inductor, and generating a current detection signal;

a switching control circuit comparing the current detection signal with the first threshold signal and the second threshold signal to turn off the switching device when the current detection signal is equal to or larger than the first threshold signal, and to turn on the switching device when the current detection signal is equal to or smaller than the second threshold signal;

a switching frequency detector circuit detecting the switching frequency of the switching device, and outputting a switching frequency detection signal; and that the second threshold signal generator circuit sets a voltage dividing ratio of the second threshold signal to the first threshold signal to be smaller than a switching frequency indicated by the switching frequency detection signal.

The switching frequency detector circuit includes a cascade connection circuit including an integration circuit, a timer circuit, and a low-pass filter circuit, the driving signal fed to the switching device is inputted to the switching frequency detector circuit, and the switching frequency detector circuit outputs a voltage signal corresponding to the switching frequency.

According to the invention, the switching device is turned on and off so that the current flowing through the inductor may be between the first threshold signal, in-phase with and similar to the input voltage and having an amplitude proportional to the voltage error signal, and the second threshold signal proportional to the first threshold signal. In the switching power supply apparatus according to the invention, the switching device is turned on and off for unfixed ON- and OFF-periods. The switching device in the switching power supply apparatus according to the invention is turned on and off automatically for the optimum ON- and OFF-periods depending on the state of the input voltage and the state of the load. Therefore, the power factor is improved.

According to the invention, the switching frequency is changed by the change of the ON- and OFF-periods and the spectrum of the noses caused is diversified. Therefore, the switching power supply apparatus according to the invention facilitates reducing the noises. By detecting the switching frequency for changing the proportional factor of the first and second threshold signals, the switching frequency variation due to the inductance variation is prevented from causing and the high frequency noises and switching losses are reduced.

BRIEF DESCRIPTIONS OF THE DRAWINGS

MODES FOR CARRYING OUT THE INVENTION

Now the invention will be described in detail hereinafter with reference to the accompanied drawings which illustrate the preferred embodiments of the invention.

Figure 1:
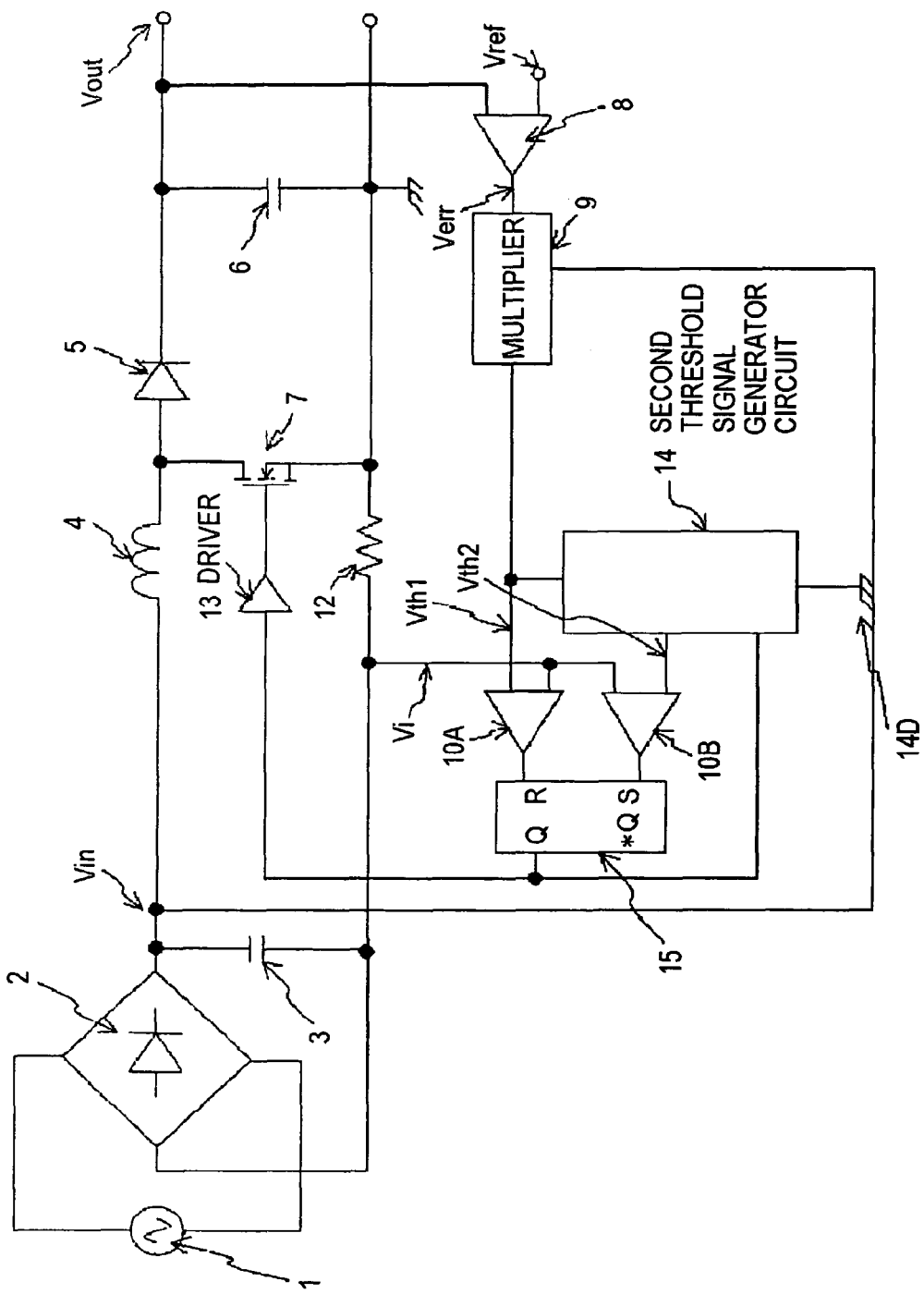
FIG. 1 is a block circuit diagram showing the configuration of a switching power supply apparatus according to an embodiment of the invention.
Figure 6:
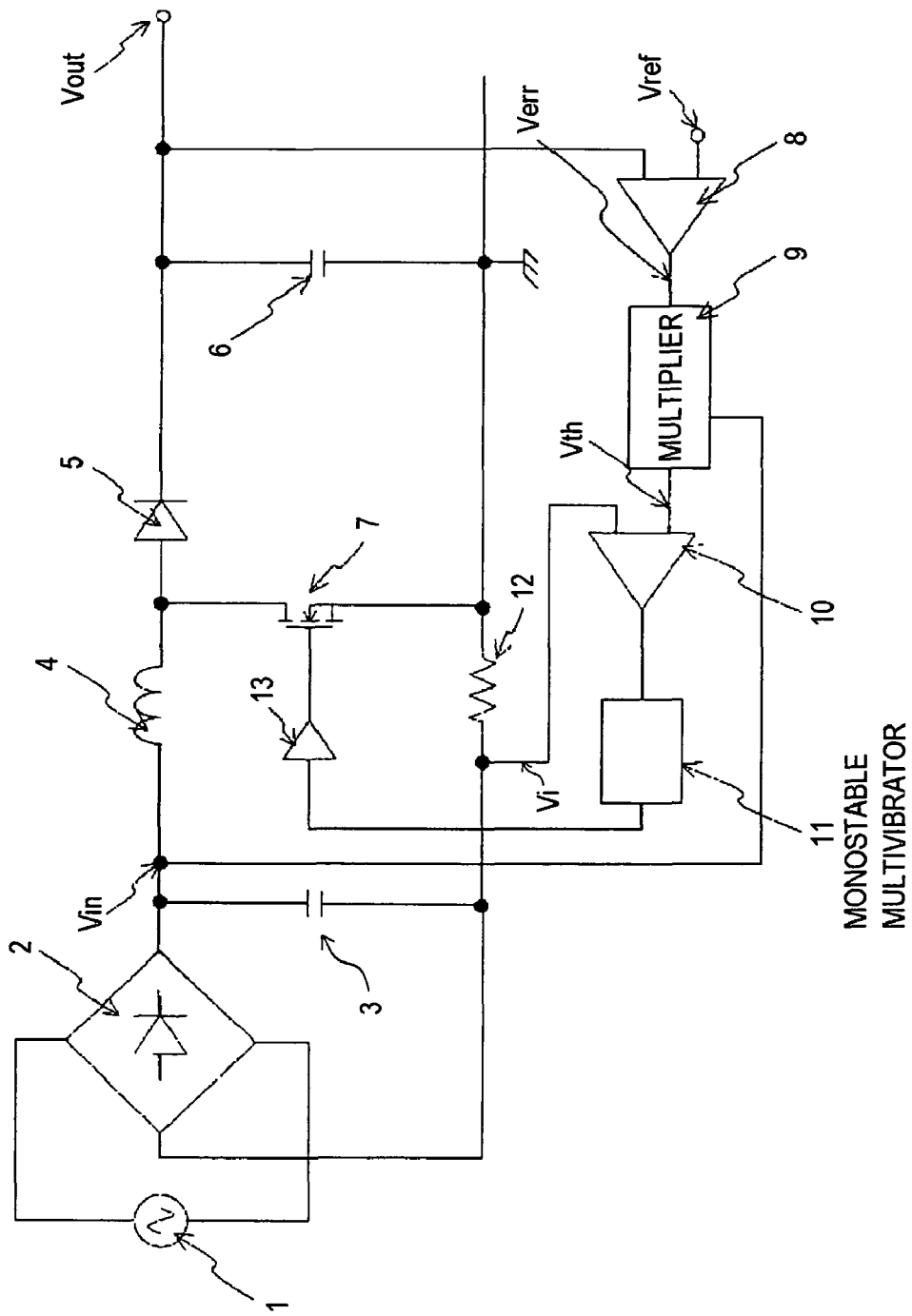
FIG. 6 is a block circuit diagram showing the conventional switching power supply apparatus of the continuous conduction-mode-control-type disclosed in Japanese Unexamined Patent Application Publication No. Hei. 04 (1992)-168975.
Figure 7A:
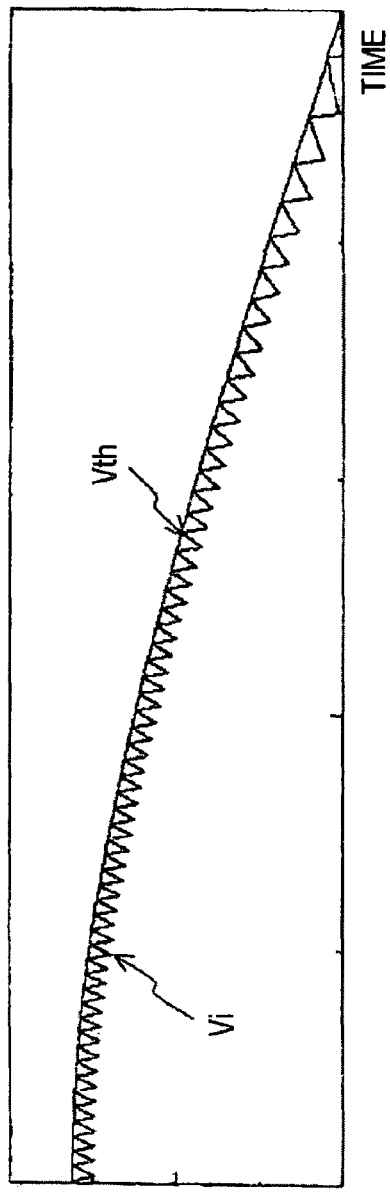
FIG. 7A is a wave chart describing the relation between threshold signal Vth and current detection signal Vi.
Figure 7B:
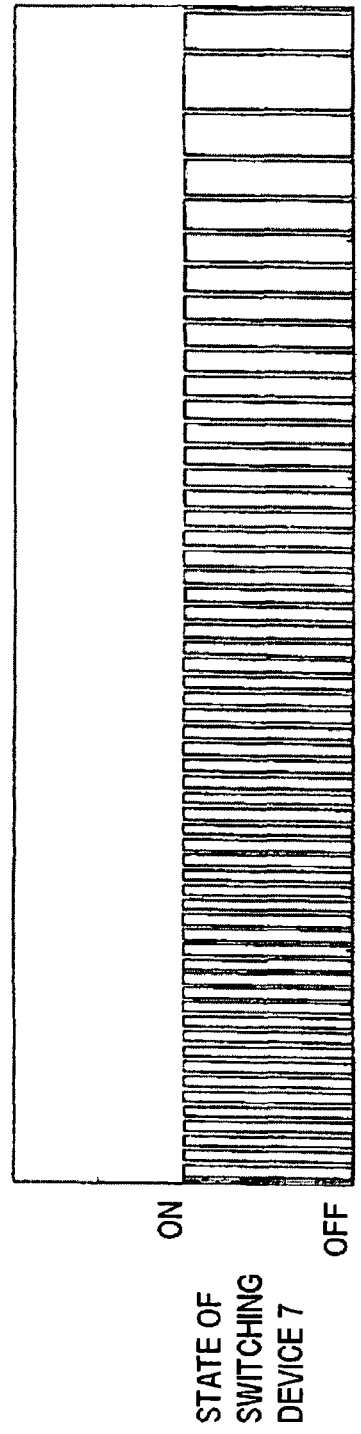
FIG. 7B is a wave chart describing the ON- and OFF-waveform of switching device 7.

FIG. 1 is a block circuit diagram showing the configuration of a switching power supply apparatus according to an embodiment of the invention. In FIG. 1, the same reference numerals as used in FIG. 6 are used to designate the same constituent elements and their duplicated description are omitted for the sake of simplicity.

The output voltage from AC power supply 1 is full-wave-rectified by rectifier circuit 2 formed of a diode bridge and high frequency noises are removed by capacitor 3. A current is fed to capacitor 6 via inductor 4 and diode 5 and smoothed DC voltage Vout is outputted. The one end of switching device 7 such as a MOSFET is connected between inductor 4 and diode 5. As switching device 7 is turned on and the inductor current from inductor 4 flows through switching device 7, the inductor current increases. As the inductor current increases, energy is stored in inductor 4. As switching device 7 is turned off, the inductor current is turned to flow to diode 5 and the energy stored in inductor 4 is released to the output side.

Voltage error amplifier 8 outputs error voltage Verr obtained by amplifying the difference between output voltage Vout and output reference voltage Vref to multiplier 9. Multiplier 9 multiplies error voltage Verr and input voltage Vin and generates first threshold signal Vth1 in-phase with and similar to input voltage Vin and having an amplitude proportional to error voltage Verr. Second threshold signal generator circuit 14 generates second threshold signal Vth2 based on the first threshold signal Vth1.

The current flowing through inductor 4 is converted to current detection signal Vi by current detecting resistor 12 and current detection signal Vi is compared with first threshold signal Vth1 in comparator 10A and with second threshold signal Vth2 in comparator 10B. The output from comparator 10A is fed to the reset terminal of flip-flop 15 and the output from comparator 10B to the set terminal of flip-flop 15. The Q output from flip-flop 15 is fed to driver circuit 13. Driver circuit 13 turns on switching device 7 when the input to driver circuit 13 is at the high level and turns off switching device 7 when the input to driver circuit 13 is at the low level.

Since current detection signal Vi is negative in the circuit configuration shown in FIG. 1, it is necessary to invert current detection signal Vi to a positive one by a not-shown inverting amplifier circuit. Alternatively, it is necessary to set first and second threshold signals Vth1 and Vth2 to be negative and to enable comparators 10A and 10B to treat negative values. In the following descriptions, the potential at the end of current detecting resistor 12 is inverted by a not-shown inverting amplifier circuit and positive current detection signal Vi is obtained.

As switching device 7 in the circuit configured as described above is turned on, the current from inductor 4 increases and current detection signal Vi rises. As current detection signal Vi becomes equal to or larger than first threshold signal Vth1, the output from comparator 10A is set at the high level and flip-flop 15 is reset. As flip-flop 15 is reset, the Q output from flip-flop 15 is set at the low level and switching device 7 is turned off by driver circuit 13. As switching device 7 is turned off, the current from inductor 4 decreases gradually. As current detection signal Vi becomes equal to or smaller than second threshold signal Vth2, the output from comparator 10B is set at the high level and flip-flop 15 is set. As flip-flop 15 is set, the Q output from flip-flop 15 is set at the high level and switching device 7 is turned on by driver circuit 13.

Figure 2A:
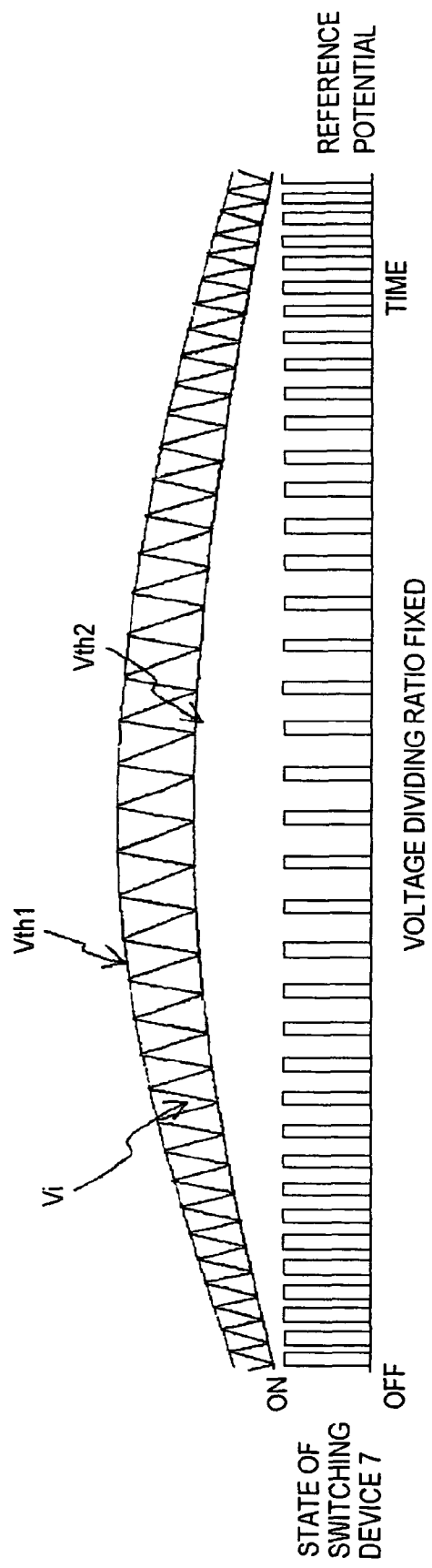
FIG. 2A is a wave chart describing the operation of the conventional switching power supply, in which the voltage dividing ratio of second threshold signal Vth2 to first threshold Vth1 is constant.
Figure 2B:
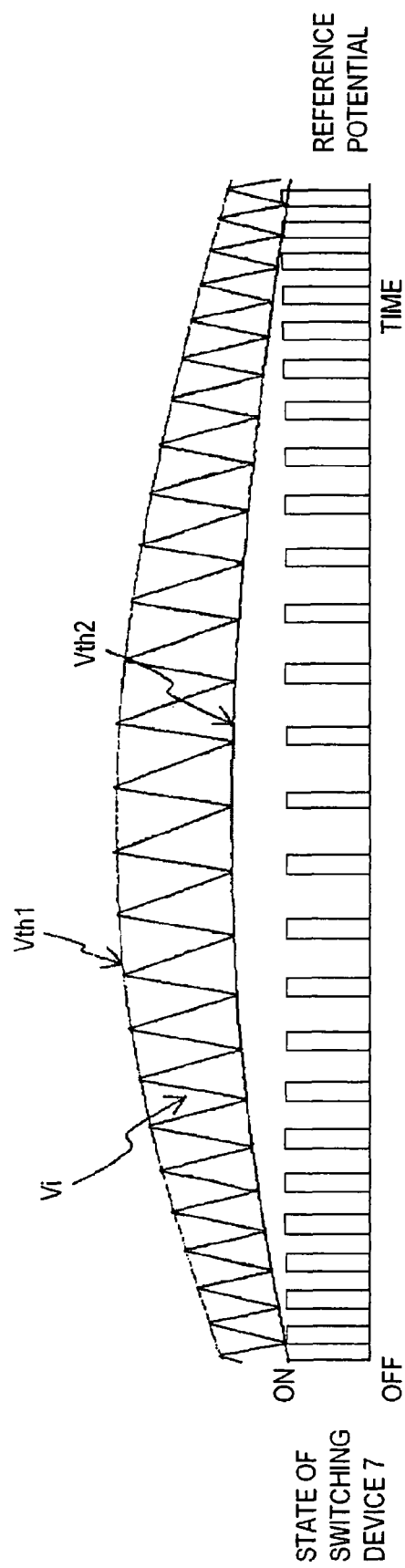
FIG. 2B is a wave chart for comparing the operation of the switching power supply according to the invention with the operation of the conventional switching power supply described in FIG. 2A.

FIGS. 2A and 2B are wave charts for comparing the operations of the circuit shown in FIG. 1 with the operations of the conventional circuit shown in FIG. 6.

As shown in FIGS. 2A and 2B, the peaks of detection signal of the current flowing through inductor 4 (indicated by current detection signal Vi in FIGS. 2A and 2B) are controlled so that the peaks of current detection signal Vi may coincide with first threshold signal Vth1 in-phase with and similar to input voltage Vin. The bottoms of detection signal of the current flowing through inductor 4 are controlled so that the bottoms of current detection signal Vi may coincide with second threshold signal Vth2.

Now one considers the case, in which the changing rate (di/dt) of the inductor current becomes large and the switching frequency becomes too high in the conventional switching power supply apparatus. In the conventional switching power supply apparatus, the voltage dividing ratio (Vth2/Vth1) of second threshold signal Vth2 to first threshold signal Vth1 shown in FIG. 2A is constant. In the switching power supply apparatus according to the embodiment of the invention, second threshold signal generator circuit 14 works to reduce the voltage dividing ratio described above. By reducing the voltage dividing ratio (Vth2/Vth1) of second threshold signal Vth2 to first threshold signal Vth1, the difference between first threshold signal Vth1 and second threshold signal Vth2 is widened, the amplitude of the current flowing through inductor 4 becomes large as shown in FIG. 2B and the switching frequency is suppressed. Therefore, it is possible to reduce the noises and switching losses.

When the switching frequency becomes too low, second threshold signal generator circuit 14 works to increase the above-described voltage dividing ratio (makes the voltage dividing ratio close to 1). The response time of second threshold signal generator circuit 14 is longer than the period of the AC power supply inputted. The switching power supply apparatus according to the invention does not always make all the switching periods coincide with each other. The switching power supply apparatus according to the embodiment of the invention considers the average switching frequency.

Figure 3:
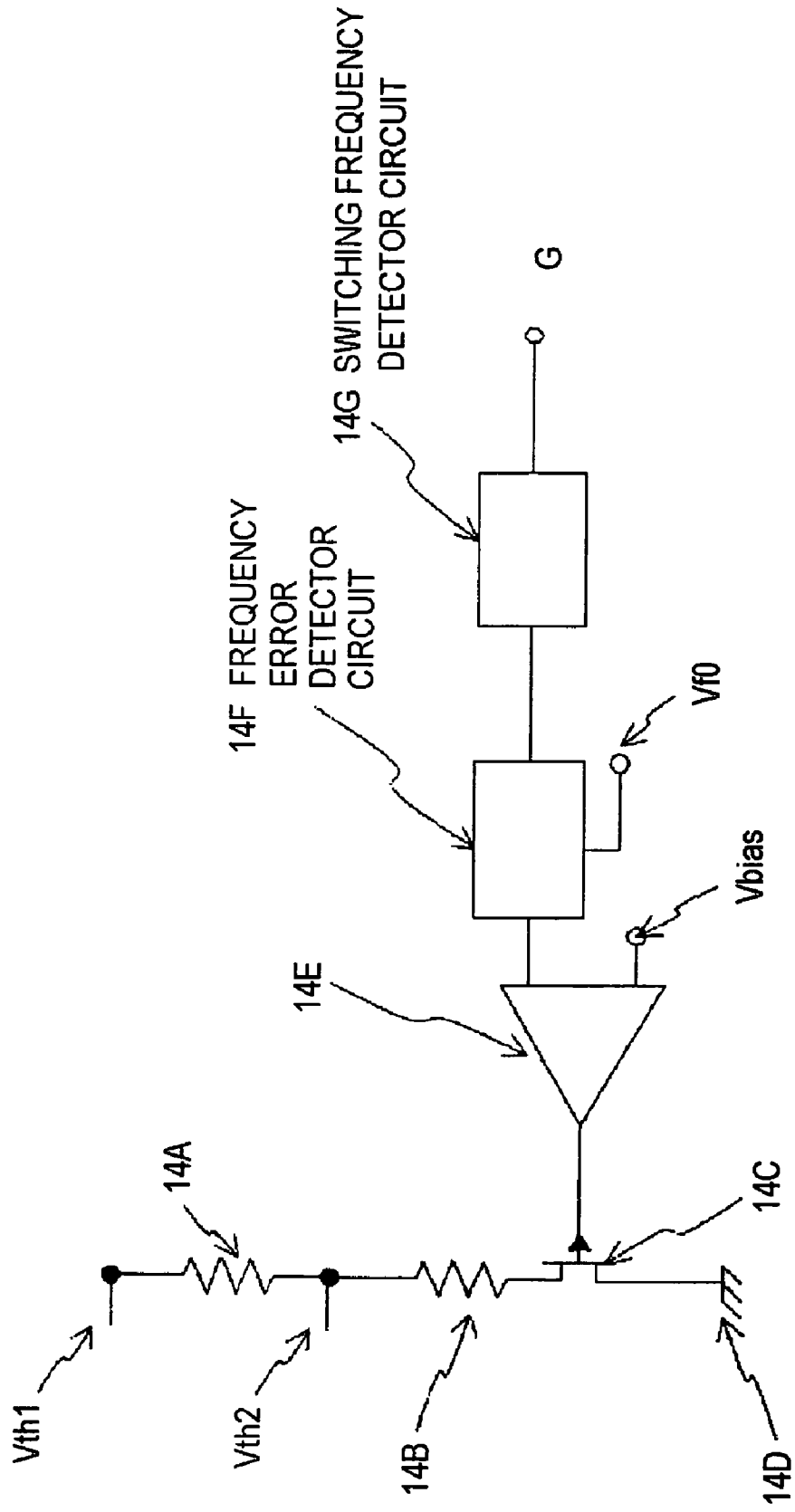
FIG. 3 is a block circuit diagram showing the concrete circuit configuration of the second threshold signal generator circuit shown in FIG. 1.

FIG. 3 is a block circuit diagram showing the concrete circuit configuration of second threshold signal generator circuit 14 that realizes the functions described above.

Referring now to FIG. 3, second threshold signal Vth2 is generated by dividing first threshold signal Vth1 by first resistor 14A, second resistor 14B, and transistor 14C connected in series between first threshold signal Vth1 and reference potential 14D. The potential at the connection point of first and second resistors 14A and 14B provides second threshold signal Vth2. The second end of second resistor 14B, the first end thereof is connected to first resistor 14A, and the drain terminal of transistor 14C such as an N-channel field effect transistor are connected in series to each other. The source terminal of transistor 14C is connected to reference potential 14D. Second resistor 14B may be omitted. When second resistor 14B is omitted, the potential at the connection point of first resistor 14A and transistor 14C provides second threshold signal Vth2.

The gate terminal of transistor 14C is connected to the output terminal of transistor driver circuit 14E. Transistor driver circuit 14E converts the voltage level of the output from frequency error detector circuit 14F, generates a driving voltage and outputs the driving voltage generated for driving the gate terminal of transistor 14C. The bias voltage for setting the conditions for making the transistor, that requires the linear operation of transistor driver circuit 14E, conduct the linear operation as requested is designated as Vbias. Frequency error detector circuit 14F outputs an error signal obtained by amplifying the difference between the output from switching frequency detector circuit 14G and reference frequency signal Vf0. Switching frequency detector circuit 14G converts the frequency of gate driving signal G to a voltage signal and feeds the converted voltage signal to frequency error detector circuit 14F.

For example, when the inductance of inductor 4 is small and the switching frequency rises, the output from switching frequency detector circuit 14G becomes large and the output from frequency error detector circuit 14F also becomes large. Therefore, the output from transistor driver circuit 14E becomes high, transistor 14C is brought into the state of low resistance and the voltage dividing ratio of second threshold signal Vth2 to first threshold signal Vth1 becomes small.

When the switching frequency lowers, opposite operations are conducted as described in the brackets. As the switching frequency becomes high (low), the output from switching frequency detector circuit 14G becomes large (small). As the output from switching frequency detector circuit 14G becomes large (small), the output from frequency error detector circuit 14F becomes large (small). As the output from frequency error detector circuit 14F becomes large (small), output from transistor driver circuit 14E becomes high (low). As the output from transistor driver circuit 14E becomes high (low), transistor 14C is brought into the state of low resistance (high resistance). As transistor 14C is brought into the state of low resistance (high resistance), the voltage dividing ratio of second threshold signal Vth2 to first threshold signal Vth1 becomes small (large). Thus, a negative feedback operation is realized and, by which, the switching frequency is prevented from varying.

It is also possible to deal with various situations by connecting various voltage divider circuits, such as the voltage divider circuit including first resistor 14A, second resistor 14B and transistor 14C and the voltage divider circuit including first resistor 14A and transistor 14C, that exhibit different voltage dividing performances in parallel and by selecting an appropriate one of the voltage divider circuits.

Figure 4:
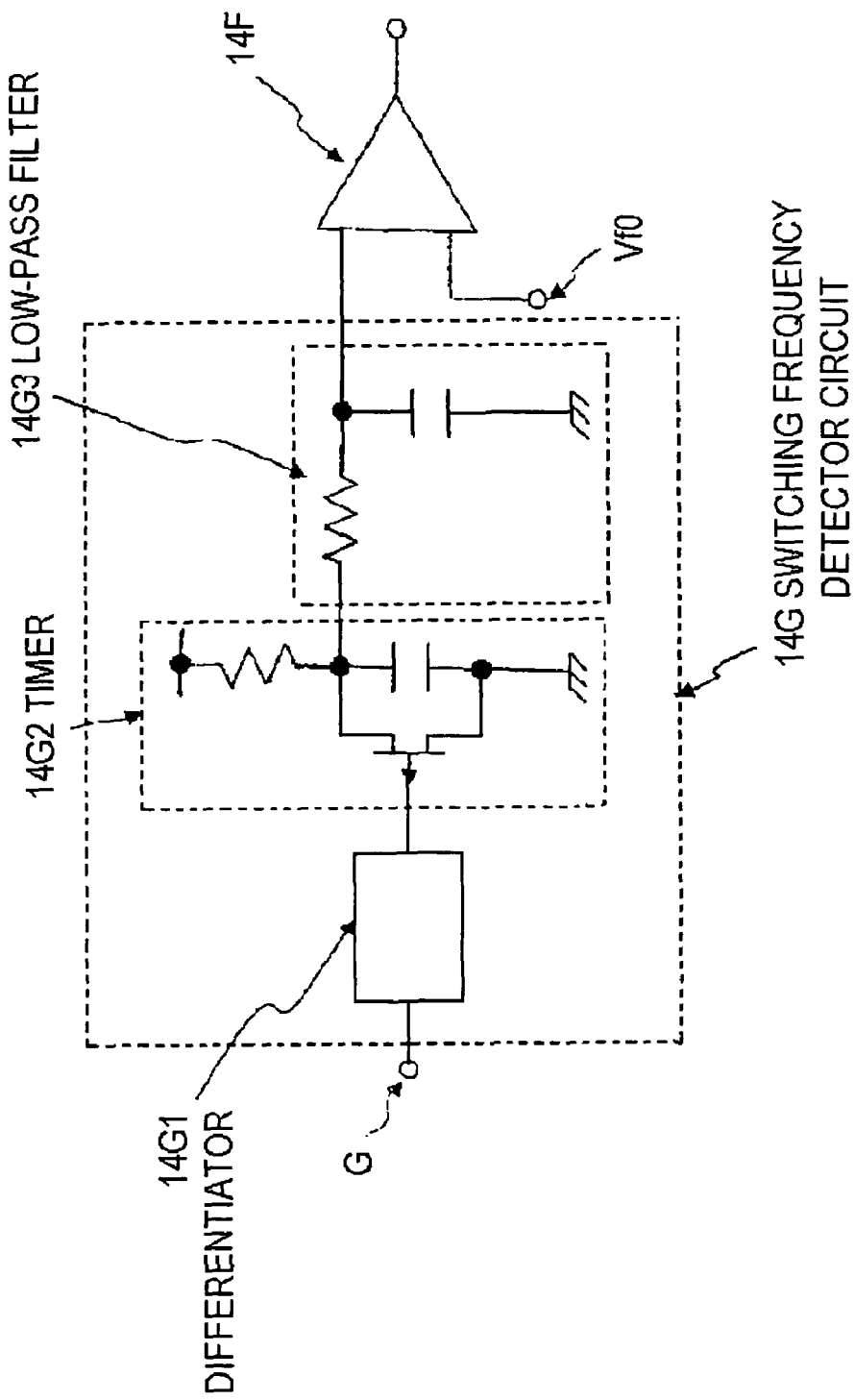
FIG. 4 is a block circuit diagram shows a concrete example of the switching frequency detector circuit shown in FIG. 3.
Figure 5:
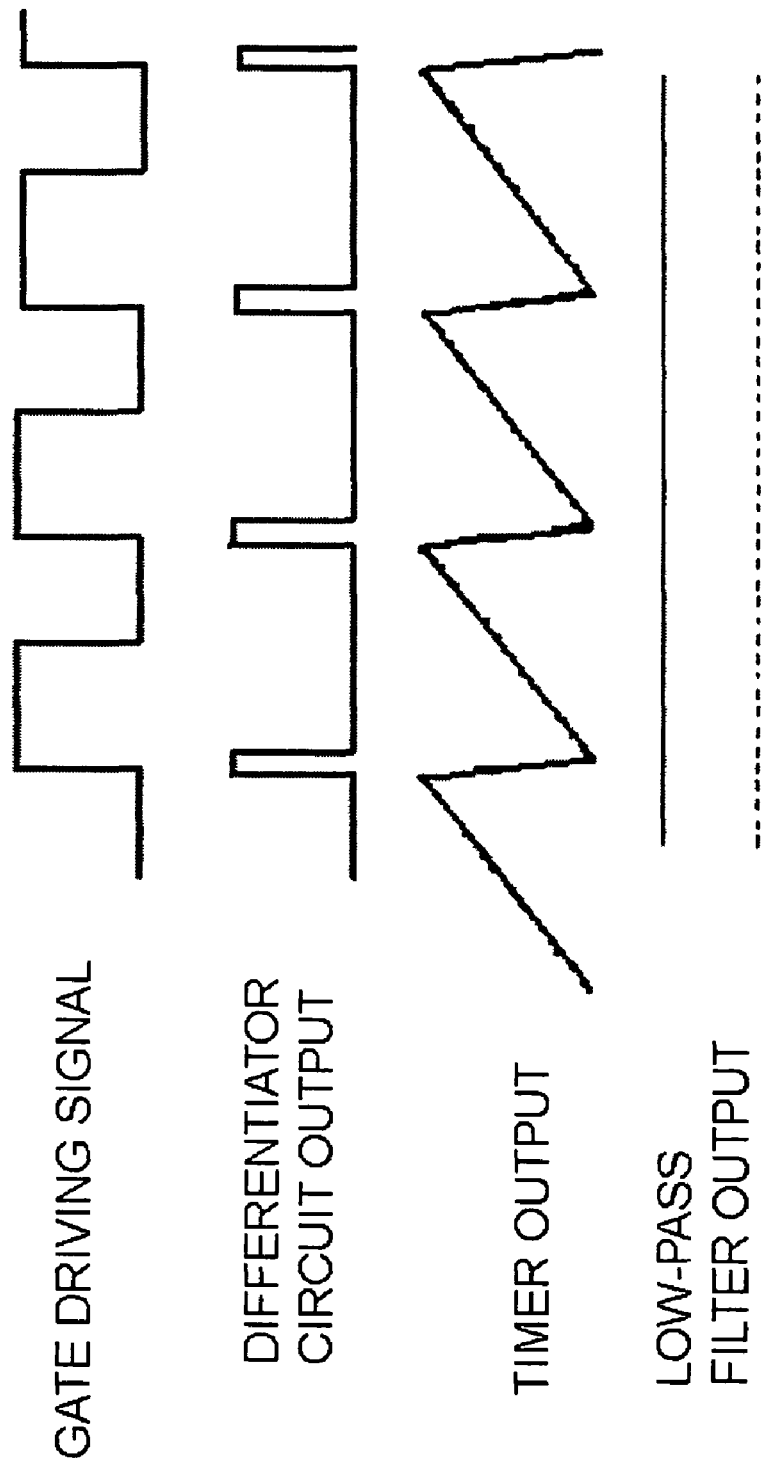
FIG. 5 is a wave chart describing the operations of the switching frequency detector circuit shown in FIG. 4.

FIG. 4 is a block circuit diagram shows a concrete example of the switching frequency detector circuit shown in FIG. 3. FIG. 5 is a wave chart describing the operations of the switching frequency detector circuit shown in FIG. 4.

Referring now to FIG. 4, switching frequency detector circuit 14G includes differentiator circuit 14G1, timer circuit 14G2, and low-pass filter circuit 14G3. Frequency error detector circuit 14F is shown also in FIG. 3 and configured in the same manner as the error amplifier. Timer circuit 14G2 is formed, for example, of a CR integration circuit that turns on the transistor disposed in timer circuit 14G2 to reset (zero-clear) the voltage integrated in capacitor C every time when an output signal is outputted from differentiator circuit 14G1. If described strictly, the timer output waveform is not straight as described in FIG. 5 but proportional to an exponential function (1−EXP(−t/CR)). Here, CR is a time constant.

The final output from low-pass filter circuit 14G3 is larger as the frequency of the gate driving signal fed to integration circuit 14G1 is lower. Since the voltage integrated in the capacitor is reset before the timer output rises when the frequency of the gate driving signal is high, the output voltage from low-pass filter circuit 14G3 is low. In other words, the output voltage is inversely proportional to the frequency of the gate driving signal or the output voltage reduces monotonically with the frequency of the gate driving signal. If the output from low-pass filter circuit 14G3 is inputted to an inverting amplifier circuit and the output from the inverting amplifier circuit is used for the output of switching frequency detector circuit 14G, the output voltage will be proportional to the frequency of the gate driving signal or the output voltage will increase monotonically with the frequency of the gate driving signal.

The resistor in timer circuit 14G2 may be replaced by a constant current supply. If the resistor in timer circuit 14G2 is replaced by a constant current supply, the timer output will be a signal that increases perfectly linearly as shown in FIG. 5. For preventing the interference between the timer circuit and the low-pass filter from causing, a voltage follower may be disposed between the timer circuit and the low-pass filter. Any type of low-pass filters other than the low-pass filter shown in FIG. 4 may be employed with no problem.

What is claimed is:

1. A switching power supply apparatus comprising:
    a rectifier circuit conducting full-wave-rectification of an AC power supply voltage to obtain a pulsating output;
    a chopper circuit comprising an inductor, a capacitor, and a switching device, the inductor being connected to the rectifier circuit at a first end and the switching device at a second end, the capacitor smoothing a current fed from the inductor to obtain a DC output, the switching device switching on or off the current fed to the capacitor;
    an input voltage detector circuit detecting a voltage input to the chopper circuit and outputting an input voltage detection signal;
    an output voltage error detector circuit detecting an error between the input voltage detection signal and a set voltage, and outputting an output voltage error signal;
    a first threshold signal generator circuit generating a first threshold signal in-phase with the input voltage detection signal, the first threshold signal comprising a waveform corresponding to a waveform of the input voltage detection signal, and the first threshold signal having an amplitude proportional to the output voltage error signal;
    a second threshold signal generator circuit dividing a potential difference between the first threshold signal and a reference potential, and generating a second threshold signal;
    a current detector circuit detecting a current flowing through the inductor, and outputting a current detection signal;
    a switching control circuit comparing the current detection signal with the first threshold signal and the second threshold signal to turn off the switching device when the current detection signal is equal to or larger than the first threshold signal, and to turn on the switching device when the current detection signal is equal to or less than the second threshold signal;
    a switching frequency detector circuit detecting a switching frequency of the switching device, and outputting a frequency detection signal; and
    a frequency error detector circuit comparing the frequency detection signal with a reference frequency signal and outputting a frequency error signal,
    wherein the second threshold signal generator circuit changes a voltage dividing ratio of the second threshold signal to the first threshold signal based on the frequency error signal to set the frequency detection signal to be substantially constant.

2. The switching power supply apparatus according to claim 1, wherein
    the second threshold signal generator circuit comprises a first resistor comprising a first end connected to the first threshold signal generator circuit, and a transistor connected between a second end of the first resistor and the reference potential,
    the second threshold signal generator circuit divides a potential difference between the first threshold signal and the reference potential with the first resistor and the transistor for generating the second threshold signal, and
    the transistor is driven based on the frequency error signal for changing the voltage dividing ratio of the second threshold signal to the first threshold signal, whereby to set the frequency detection signal to be almost constant.

3. The switching power supply apparatus according to claim 2, wherein
    the switching frequency detector circuit comprises a cascade connection circuit, the cascade connection circuit comprising an integration circuit, a timer circuit, and a low-pass filter circuit,
    a driving signal fed to the switching device is inputted to the switching frequency detector circuit, and
    the switching frequency detector circuit outputs a voltage signal corresponding to the switching frequency.

4. The switching power supply apparatus according to claim 1, wherein
    the second threshold signal generator circuit comprises a first resistor having a first end connected to the first threshold signal generator circuit and a series circuit, the series circuit comprising a second resistor having a first end connected to a second end of the first resistor and a transistor, the transistor connected between a second end of the second resistor and the reference potential,
    the second threshold signal generator circuit divides a potential difference between the first threshold signal and the reference potential of the first resistor and the series circuit, and generates the second threshold signal, and
    the transistor is driven based on the frequency error signal for changing the voltage dividing ratio of the second threshold signal to the first threshold signal, to set the frequency detection signal to be substantially constant.

5. The switching power supply apparatus according to claim 4, wherein
    the switching frequency detector circuit comprises a cascade connection circuit, the cascade connection circuit comprising an integration circuit, a timer circuit, and a low-pass filter circuit,
    a driving signal fed to the switching device is inputted to the switching frequency detector circuit, and the switching frequency detector circuit outputs a voltage signal corresponding to the switching frequency.

6. The switching power supply apparatus according to claim 1, wherein
the switching frequency detector circuit comprises a cascade connection circuit, the cascade connection circuit comprising an integration circuit, a timer circuit, and a low-pass filter circuit,
a driving signal fed to the switching device is inputted to the switching frequency detector circuit, and
the switching frequency detector circuit outputs a voltage signal corresponding to the switching frequency.

7. A switching power supply apparatus comprising:
a rectifier circuit conducting full-wave-rectification of an AC power supply voltage to obtain a pulsating output;
a chopper circuit comprising an inductor, a capacitor, and a switching device, the inductor being connected to the rectifier circuit at a first end and the switching device at a second end, the capacitor smoothing a current fed from the inductor to obtain a DC output, the switching device switching on or off the current fed to the capacitor;
an input voltage detector circuit detecting a voltage input to the chopper circuit and outputting an input voltage detection signal;
an output voltage error detector circuit detecting an error between the input voltage detection signal and a set voltage, and outputting an output voltage error signal;
a first threshold signal generator circuit generating a first threshold signal in-phase with the input voltage detection signal, the first threshold signal comprising a waveform corresponding to a waveform of the input voltage detection signal, and the first threshold signal comprising an amplitude proportional to the output voltage error signal;
a second threshold signal generator circuit dividing a potential difference between the first threshold signal and a reference potential, and generating a second threshold signal;
a current detector circuit detecting a current flowing through the inductor, and generating a current detection signal;
a switching control circuit comparing the current detection signal with the first threshold signal and the second threshold signal to turn off the switching device when the current detection signal is equal to or larger than the first threshold signal, and to turn on the switching device when the current detection signal is equal to or smaller than the second threshold signal;
a switching frequency detector circuit detecting a switching frequency of the switching device, and outputting a switching frequency detection signal,
wherein the second threshold signal generator circuit sets a voltage dividing ratio of the second threshold signal to the first threshold signal to be smaller than a switching frequency indicated by the switching frequency detection signal.

8. The switching power supply apparatus according to claim 7, wherein
the switching frequency detector circuit comprises a cascade connection circuit, the cascade connection circuit comprising an integration circuit, a timer circuit, and a low-pass filter circuit,
a driving signal fed to the switching device is inputted to the switching frequency detector circuit, and
the switching frequency detector circuit outputs a voltage signal corresponding to the switching frequency.

* * * * *